United States Patent
Decker et al.

(10) Patent No.: US 6,389,640 B1
(45) Date of Patent: May 21, 2002

(54) DRYING DEVICE FOR DRYING OF VEHICLES IN VEHICLE WASHING SYSTEMS

(75) Inventors: Wolfgang Decker, Zusmarshausen-Wollbach (DE); Pierre Zeyer, Wuenheim (FR)

(73) Assignee: WashTec Holding GmbH, Augsburg (DE)

( * ) Notice: Subject to any disclaimer, the term of this patent is extended or adjusted under 35 U.S.C. 154(b) by 0 days.

(21) Appl. No.: 09/547,652

(22) Filed: Apr. 12, 2000

(30) Foreign Application Priority Data

Apr. 14, 1999 (DE) .......................... 199 16 654

(51) Int. Cl.$^7$ ............... B60S 3/04; B08B 3/02
(52) U.S. Cl. .................. 15/316.1; 15/DIG. 2
(58) Field of Search ............... 15/302, 312.1, 15/316.1, 317, 318.1, 405, DIG. 2

(56) References Cited

U.S. PATENT DOCUMENTS

| | | | | |
|---|---|---|---|---|
| 5,749,161 A | * | 5/1998 | Jones | |
| 5,901,461 A | * | 5/1999 | McElroy | |
| 6,154,916 A | * | 12/2000 | Ayers | |

FOREIGN PATENT DOCUMENTS

| | | |
|---|---|---|
| DE | 2 334 840 | 10/1974 |
| DE | 2334840 | * 10/1974 |
| DE | 3108248 | * 9/1982 |
| DE | 3401379 | * 7/1985 |
| DE | 3540598 | * 5/1987 |
| DE | 3807884 | * 9/1989 |
| DE | 94 22 132 U1 | 5/1998 |

* cited by examiner

*Primary Examiner*—Terrence R. Till
(74) *Attorney, Agent, or Firm*—Flynn, Thiel, Boutell & Tanis, P.C.

(57) ABSTRACT

A drying device for drying of vehicles in vehicle washing systems, in particular portal vehicle washing systems, comprising a nozzle housing, which is elevationally movable in dependency of the contour of the vehicle, extends transversely with respect to the longitudinal direction of the vehicle, and is pivotal about a horizontal axis of rotation extending transversely with respect to the longitudinal direction of the vehicle by means of a servomotor, is being described. The nozzle housing has at least one slot-shaped outlet nozzle extending transversely with respect to the longitudinal direction of the vehicle, and is connected to a blower. A control acts onto the servomotor in order to adapt the outlet direction of the outlet nozzle to the contour of the vehicle. The nozzle housing can be rotated through at least 360°.

5 Claims, 3 Drawing Sheets

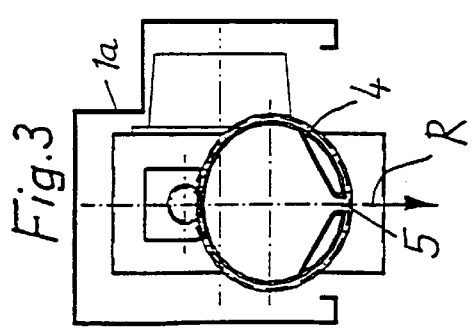
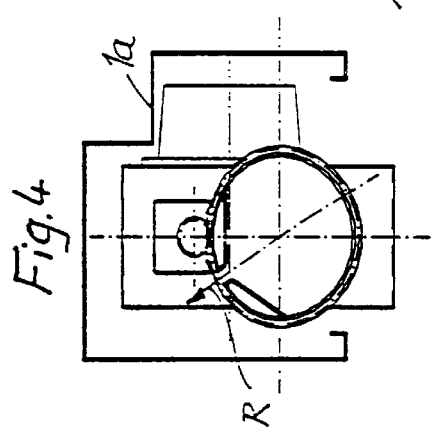
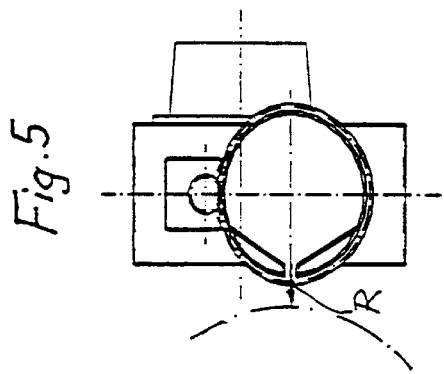
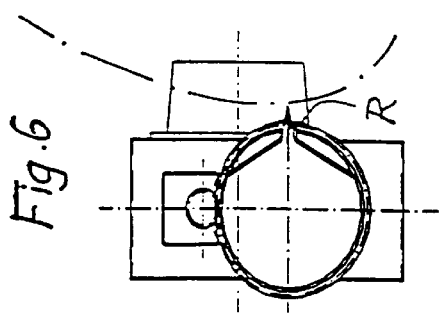
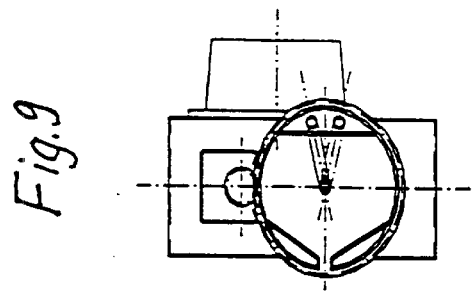
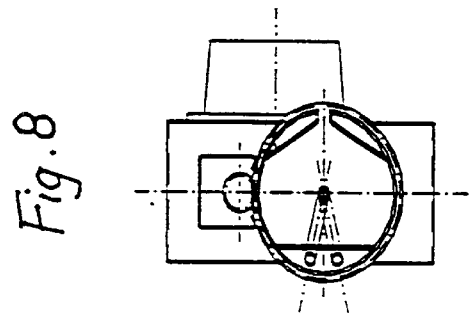
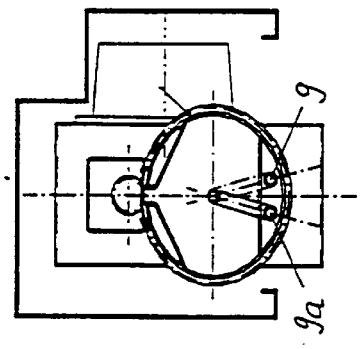

US 6,389,640 B1

DRYING DEVICE FOR DRYING OF VEHICLES IN VEHICLE WASHING SYSTEMS

FIELD OF THE INVENTION

The invention relates to a drying device for drying of vehicles in vehicle washing systems, in particular portal vehicle washing systems, whereby device and vehicle move relative to one another in longitudinal direction of the vehicle, comprising a horizontal pivot axle, which is elevationally movable in dependency of the contour of the vehicle, extends transversely with respect to the longitudinal direction of the vehicle, and is rotatable about a horizontal axis of rotation extending transversely with respect to the longitudinal direction of the vehicle by means of a servomotor, and wherein a nozzle housing has at least one slot-shaped outlet nozzle extending transversely with respect to the longitudinal direction of the vehicle and comprises at least one blower connected to the nozzle housing, and a control acting onto the servomotor in order to adapt the outlet direction of the outlet nozzle to the contour of the vehicle.

BACKGROUND OF THE INVENTION

Such a drying device is known from DE 94 22 132 U1. The nozzle housing and the blower form in this conventional drying device one unit rotatable about the axis of rotation The rotatable range, in which the nozzle housing is rotatable about the axis of rotation, is limited to 90°. It is indeed possible to adjust with this the outlet direction of the outlet nozzle to the upper area of the contour of the vehicle, however, the nozzle housing cannot be adjusted in such a manner that the air stream exiting from the outlet nozzle becomes active on the front and the rear of the vehicle as well as below the bumper area, which area in modern vehicles, is inwardly offset and relatively large. It is also disadvantageous that the relatively heavy blower forms one unit with the nozzle housing and must be rotated together with same. Since relatively large masses must be moved hereby, a correspondingly heavy-duty servomotor is also needed and also only relatively slow rotating movements are possible.

The basic purpose of the invention is therefore to provide a drying device for drying of vehicles in vehicle washing systems, in particular portal vehicle washing systems of the above-mentioned type, in which the outlet direction of the outlet nozzle can be adjusted in each case in such a manner that an optimum drying of the vehicle is guaranteed.

This purpose is attained according to the invention by the nozzle housing being rotatable through at least 360°.

With this design of the drying device it is possible to move the nozzle housing by means of the control and of the servomotor into the respective most advantageous rotated position in order to change the outlet direction of the outlet nozzle and to guarantee an optimum drying effect. This means that, for example, vertical surfaces of a vehicle can be worked by the air stream at an ideal impact angle of 90°+/−X. The pivoting possibility of the nozzle housing at 360° also permits the air stream to reach the parts of the chassis below the level of the bumper. The possibility to pivot the nozzle housing at least at 360° is of particular importance in portal vehicle washing systems. Namely, parts of the portal above the vehicle, as for example the portal traverse, become wet during the washing operation. Drops of water fall then during the drying operation onto the already dried surfaces of the vehicle due to vibrations of the portal and air movements. This can be avoided with the drying device of the invention. The unlimited rotating possibility of the nozzle housing namely makes it possible during a lowering of the nozzle housing to direct the outlet nozzle upwardly prior to the actual drying operation. By rotating the nozzle housing back and forth the portal traverse can then be dried similar to the surface of the vehicle so that drops of water are first removed from the portal traverse prior to the start of the actual drying operation. During the subsequent drying operation, during which the nozzle housing is rotated, such that the outlet direction of the outlet nozzle is directed toward the vehicle, drops of water can then no longer fall from the portal traverse onto the already dried portions of the vehicle.

Thus among others the invention is based on the structural concept and method of drying parts of the portal, which parts lie above the height of the vehicle, and to essentially remove water therefrom by means of the drying nozzle provided for drying of the vehicle prior to the actual drying operation of the vehicle.

BRIEF DESCRIPTION OF THE DRAWINGS

The invention will be discussed in greater detail hereinafter in connection with one exemplary embodiment illustrated in the drawings, in which:

FIGS. 3 to 9 are similar cross-sectional views with various operating positions of the nozzle housing.

DETAILED DESCRIPTION

Figure 1:
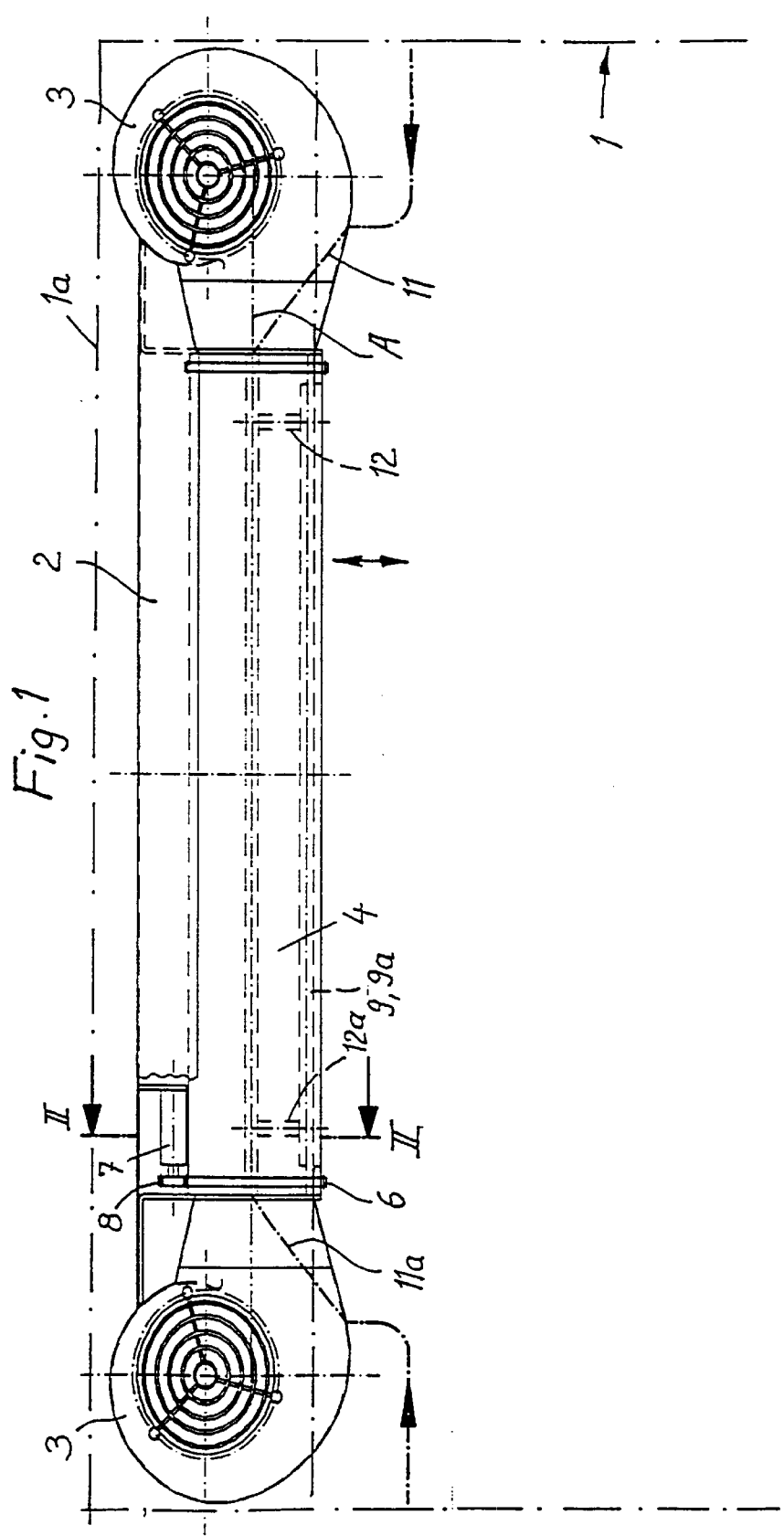
FIG. 1 is a view of the most important parts of the drying device.

A crossbeam 2 extending transversely with respect to the longitudinal direction of the vehicle is elevationally supported in a conventional manner by means of conventional control devices in dependency of the contour of the vehicle and other requirements in the portal 1, for example of a portal vehicle washing system, which portal is illustrated in dash-dotted lines in FIG. 1. The drying device of the invention is particularly advantageous when used in a portal vehicle washing system in which the vehicle stands still during the washing operation and the subsequent drying operation and the portal moves back and forth in longitudinal direction of the vehicle relative to the vehicle.

The two blowers 3 are fixedly connected to the crossbeam 2. A nozzle housing 4, which is arranged between the two blowers 3, can be rotated through at least 360° about the horizontal axis of rotation A extending transversely with respect to the longitudinal direction of the vehicle. The nozzle housing 4 has at least one slot-shaped outlet nozzle 5 extending transversely with respect to the longitudinal direction of the vehicle, namely, in direction of the nozzle housing 4.

In order to rotate the nozzle housing 4 in the desired manner about the axis of rotation A, a toothed wheel 6 is arranged on the nozzle housing 4. A pinion 8, which is driven by a servomotor 7, engages the toothed wheel 6. The servomotor 7 is controlled in a conventional manner in dependency of the contour of the vehicle and/or the position of the portal 1. The contour of the vehicle is sensed, for example by photocells, and the portal advance is sensed through an incremental transmitter, both sensings being fed into a microprocessor which calculates the respective optimum outlet direction R of the air flow from the outlet nozzle 5 in relationship to the respective vehicle portion to be dried and acts correspondingly onto the servomotor 7. Other control systems for the servomotor are also conceivable.

In order to be able to apply prior to and/or during the washing operation cleaning agents and prior to the drying operation wax and/or drying agents onto the vehicle, at least one spray pipe 9 with several spray nozzles, which spray pipe extends in direction of the axis of rotation A, is provided preferably on the area of the nozzle housing 4, which area lies opposite the outlet nozzle 5. A further spray pipe 9a with spray nozzles can be provided for supplying wash water under high pressure in order to be able to carry out a high-pressure cleaning of the vehicle. Particularly the spray pipe 9a can be rotated into a position, which is optimal for the high-pressure cleaning, by means of the servomotor 7 so that an ideal impact angle of the high-pressure jets of 90° with respect to the vehicle surface is achieved.

A supply pipeline 11, 11a is associated with each one of the spray pipes 9, 9a, which supply pipeline is guided advantageously centrally in the area of the axis of rotation A into the nozzle housing 4, and which supply pipeline is connected to the respective spray pipe 9, 9a through at least one radial connecting pipeline 12, 12a.

As has already been mentioned above, the two blowers 3 are fixedly connected to the crossbeam 2, thus are arranged non-pivotally. The two blowers 3 together with the nozzle housing 4 are elevationally movable by means of the crossbeam 2. In order to be able to adjust the outlet direction R of the outlet nozzle 5 or the spray nozzles at an optimum with respect to the vehicle surface, and the outlet direction R of the outlet nozzle 5 also with respect to the traverse 1a of the portal 1 at an optimum, this embodiment requires only a rotating of the nozzle housing 4, not, however, of the blower 3. Thus only relatively small masses must be moved by means of the servomotor 7 so that rotating movements can occur as quickly as desired and with the use of a relatively small servomotor.

Figure 2:
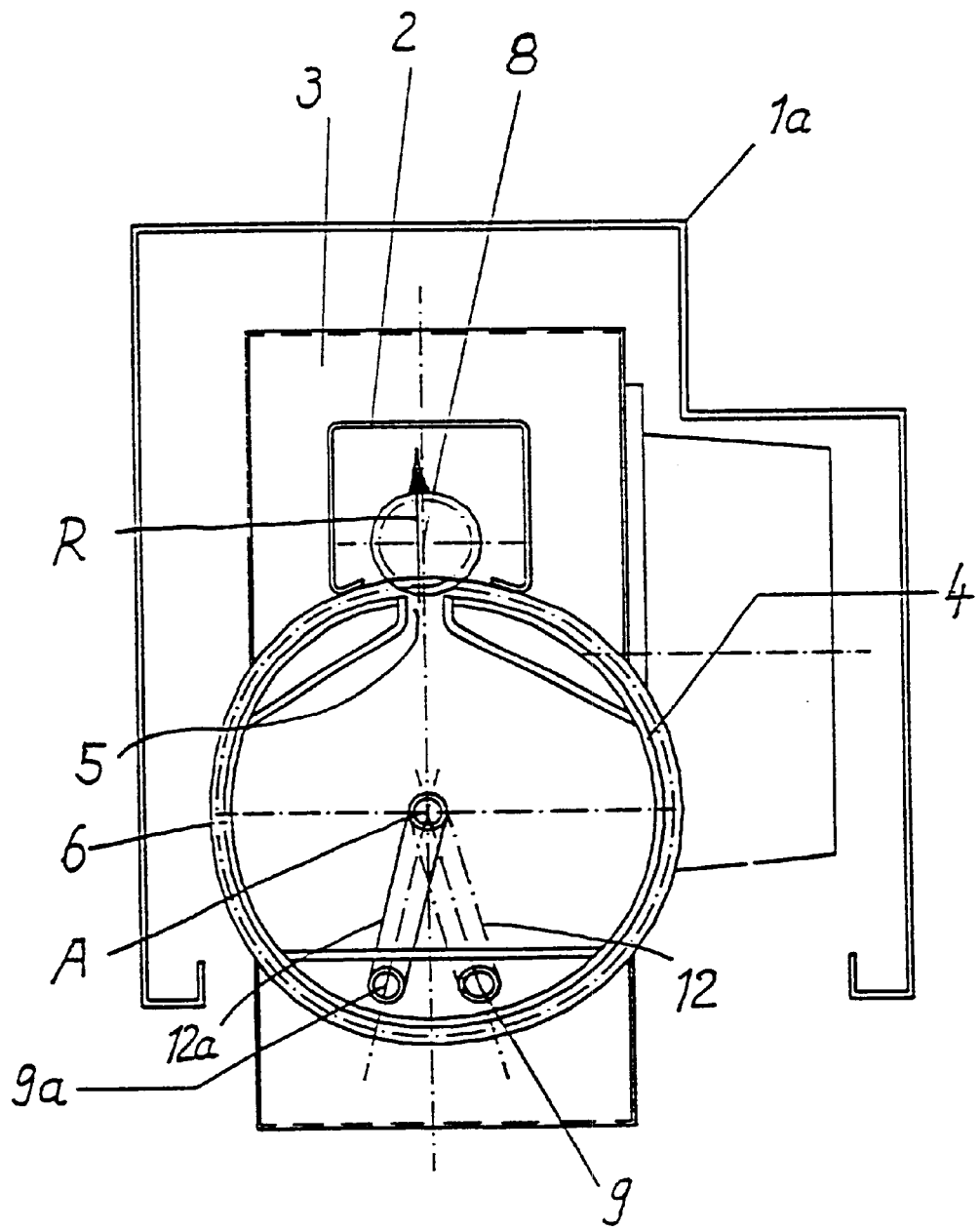
FIG. 2 is a cross-sectional view taken along the line II—II of FIG. 1.

As one can recognize from FIGS. 2 and 7, the drying device consisting of the crossbeam 2, the blower 3 and the nozzle housing 4 can be moved into the portal traverse 1a during the washing operation. The drying device can, however, be arranged, if necessary, also during the washing operation below or on one side of the portal traverse. The portal traverse 1a and also, if applicable, other parts of the portal vehicle wash, which parts are above the vehicle, usually become wet in every case during the washing operation. Drops of water adhere in particular to horizontal structural parts, which drops of water fall off during the drying operation and can result in undesired microdrops on the already dried surfaces of the vehicle. In order to prevent this, the nozzle housing 4 is moved prior to the actual drying operation by means of the servomotor 7 into a position in which the outlet direction R of the outlet nozzle 5 is directed upwardly in accordance with FIG. 4. When subsequently the crossbeam 2 with the nozzle housing 4 is lowered downwardly in order to dry the front and rear portion of the vehicle, drops of water are first blown off in particular from the horizontal structural parts of the portal traverse 1a by the upwardly directed air flow. The action of blowing off the drops of water can be further improved by rotating back and forth the nozzle housing 4 about the axis of rotation A during the lowering of the crossbeam 2. The blowing off of the portal traverse does not require any additional time since the nozzle housing 4, which is within the traverse 1a during the washing operation, must prior to the start of the actual drying operation at any rate be lowered to the level of the bumper of the vehicle. The nozzle housing 4 is during the lowering rotated into the position illustrated in FIG. 5 so that the outlet direction R of the outlet nozzle 5 is directed horizontally against the front of the vehicle. If necessary, it is possible for drying parts of the vehicle front lying below the level of the bumper to direct the outlet direction R also inclined upwardly. During the subsequent drying operation the nozzle housing 4 influenced by the control of the servo motor 7 and with said servomotor is moved each into a position favorable for achieving an optimum drying. FIG. 6 shows the position of the nozzle housing 4 during the drying of the rear of the vehicle. It is hereby also possible, if necessary, to direct the outlet direction R inclined upwardly when the outlet nozzle 5 reaches below the level of the bumper.

In connection with FIGS. 7 to 9 it is demonstrated that for applying washing agents, drying agents and wax and for carrying out a high-pressure cleaning, the nozzle housing 4 can be pivoted such that the outlet direction of the spray nozzles extends in each case approximately perpendicularly with respect to the surface of the vehicle. This is also true in this case for areas below the level of the bumper. The washing action can be improved during washing in the area of the bumper by the back and forth rotating of the nozzle housing 4. It is hereby also advantageous that only the nozzle housing 4 and not the blowers 3 need be rotated.

What is claimed is:

1. A drying device for drying of a vehicle in a vehicle washing system, in which the device and the vehicle move relative to one another along a longitudinal direction of the vehicle, comprising a portal traverse extending over the vehicle and a frame that supports a nozzle housing which is elevationally movable on the frame relative to the contour of the vehicle, the nozzle housing extending transversely with respect to the longitudinal direction of the vehicle and being rotatable by means of a servomotor about a horizontal axis of rotation that extends transversely with respect to the longitudinal direction of the vehicle, and which nozzle housing has at least one slot-shaped outlet nozzle extending transversely with respect to the longitudinal direction of the vehicle, at least one blower is connected to the nozzle housing and includes a control acting on the servomotor to adapt an outlet direction of the at least one outlet nozzle to the contour of the vehicle, and wherein the nozzle housing is rotated through at least 360° about the horizontal axis of rotation between at least one position in which the at least one outlet nozzle is directed toward the vehicle and at least one additional position in which the at least one outlet nozzle is directed away from the vehicle and toward the portal traverse to facilitate drying of the portal traverse prior to drying of the vehicle to prevent water droplets on the portal traverse from falling on the vehicle.

2. The device according to claim 1, wherein a toothed wheel is provided on the nozzle housing and is oriented concentric with the axis of rotation of said nozzle housing, and which toothed wheel can be driven through a pinion by the servomotor.

3. The device according to claim 1, wherein at least one spray pipe with several spray nozzles is provided in an area of the nozzle housing opposite the outlet nozzle, which spray pipe extends along the axis of rotation.

4. The device according to claim 3, wherein a supply pipeline is associated with the spray pipe, which supply pipeline is guided centrally in an area of the axis of rotation into the nozzle housing, and is connected to the spray pipe through at least one radial connecting pipeline.

5. The device according to claim 1, wherein at least one blower is positioned at one end of the nozzle housing and is elevationally movable with the nozzle housing and is non-rotatable, such that only the nozzle housing is rotatable about the axis of rotation.

* * * * *